United States Patent [19]
Ono et al.

[11] Patent Number: 6,027,816
[45] Date of Patent: *Feb. 22, 2000

[54] COLORED PLASTIC LENS AND METHOD OF MANUFACTURE THEREFOR

[75] Inventors: Ichiro Ono, Tokyo; Yuko Kawamura, Utsunomiya, both of Japan

[73] Assignee: Nikon Corporation, Tokyo, Japan

[ * ] Notice: This patent is subject to a terminal disclaimer.

[21] Appl. No.: 09/184,506

[22] Filed: Nov. 2, 1998

Related U.S. Application Data

[63] Continuation of application No. 08/754,089, Nov. 20, 1996, Pat. No. 5,830,578, which is a continuation of application No. 08/208,853, Mar. 11, 1994, abandoned.

[30] Foreign Application Priority Data

Mar. 11, 1993 [JP] Japan ................................. 5-051055

[51] Int. Cl.$^7$ ............................... B32B 27/00; B05D 5/00
[52] U.S. Cl. ......................... 428/447; 428/412; 428/413; 428/423.1; 428/425.5; 428/446; 428/323; 351/159; 351/163; 351/166; 359/581; 427/164; 427/386; 427/387; 427/412.1
[58] Field of Search .................... 428/323, 412, 428/413, 423.1, 423.7, 424.2, 425.5, 446, 447, 448, 451; 351/159, 163, 166; 427/164, 372.2, 385.5, 386, 387, 412.1; 359/581, 589

[56] References Cited

U.S. PATENT DOCUMENTS

| | | |
|---|---|---|
| 3,762,940 | 10/1973 | Bechtold . |
| 4,320,940 | 3/1982 | Mueller et al. ............................ 351/44 |
| 4,324,712 | 4/1982 | Vaughn, Jr. ............................... 524/767 |
| 4,401,718 | 8/1983 | Medford .................................. 428/448 |
| 4,547,397 | 10/1985 | Burzynski et al. ..................... 427/164 |
| 4,556,606 | 12/1985 | Olson ...................................... 428/412 |
| 4,895,767 | 1/1990 | Mori et al. ............................... 428/447 |
| 4,904,525 | 2/1990 | Taniguchi et al. ...................... 428/328 |
| 4,963,159 | 10/1990 | Narducy et al. ............................ 8/507 |
| 5,015,523 | 5/1991 | Kawashima et al. ................... 428/336 |
| 5,055,346 | 10/1991 | Rohrbacher ............................. 428/216 |
| 5,091,460 | 2/1992 | Seto et al. ............................... 524/492 |
| 5,134,191 | 7/1992 | Takarada et al. ....................... 524/783 |
| 5,181,142 | 1/1993 | Asai et al. ............................... 359/581 |
| 5,258,444 | 11/1993 | Zezinka et al. ......................... 524/507 |
| 5,449,731 | 9/1995 | Suzuki et al. ........................... 526/322 |
| 5,462,806 | 10/1995 | Konishi et al. .......................... 428/451 |
| 5,587,835 | 12/1996 | Shimizu et al. ........................ 359/589 |
| 5,591,517 | 1/1997 | Takamiya et al. .................... 428/304.4 |
| 5,770,259 | 6/1998 | Parker et al. ........................... 427/164 |
| 5,830,578 | 11/1998 | Ono et al. ............................... 428/446 |

FOREIGN PATENT DOCUMENTS

| | | |
|---|---|---|
| 0 125 866 | 11/1984 | European Pat. Off. . |
| 2 549 968 | 2/1985 | France . |
| 35-1384 | 2/1960 | Japan . |
| 56-153321 | 11/1981 | Japan . |
| 56-159376 | 12/1981 | Japan . |
| 60-45201 | 3/1985 | Japan . |
| 60-214301 | 10/1985 | Japan . |
| 60-221704 | 11/1985 | Japan . |
| 61-114203 | 5/1986 | Japan . |
| 1-277814 | 11/1989 | Japan . |

OTHER PUBLICATIONS

*Encyclopedia of Polymer Science and Engineering*, vol. 13, p. 243, John Wiley & Sons, Inc., (1988). [an encyclopedia does not have a publication month].

Primary Examiner—Marie Yamnitzky

[57] ABSTRACT

A colored plastic lens includes a plastic substrate having first and second surfaces, a resin film with a pigment dispersed therein formed on one of the first and second surfaces of the plastic substrate, and a coating film, preferably a hard coat film, formed on the resin film and the surface of the lens on which the resin film is not formed. A method of forming the colored plastic lens includes providing a plastic substrate having first and second sides, dispersing a pigment in a resin vehicle, coating the pigment dispersed in the resin vehicle on one of the first and second sides of the plastic substrate to thereby form a resin film, and forming a coating film, preferably a hard coat film, on the resin film and the surface of the lens on which the resin film is not formed.

19 Claims, 3 Drawing Sheets

COLORED PLASTIC LENS AND METHOD OF MANUFACTURE THEREFOR

This application is a continuation of application Ser. No. 08/754,089, filed Nov. 20, 1996, now U.S. Pat. No. 5,830,578, which is a continuation of application Ser. No. 08/208,853, filed Mar. 11, 1994, now abandoned.

BACKGROUND OF THE INVENTION

1. Field of the Invention

The present invention relates to a colored plastic lens and method of manufacturing therefor, and more particularly to a colored plastic lens which does not discolor during application of a surface hardening film.

2. Description of the Related Art

Plastic lenses have the characteristics of being easy to mold, light- and crack-resistant, and easy to color with dyes, so they have become widely used in recent years as optical lenses, and especially as optical lenses for eyeglasses. The advantage of being able to easily color plastic lenses with dyes is especially important for eyeglass fashionability and shading. It has been estimated that at least 70% of the plastic eyeglass lenses on the market are dyed. That being the case, there is an emerging need for a high-volume dyeing method which yields uniform, consistent color as well as a large variety of colors. The most commonly used method for dyeing plastic lenses is the so-called dip-dyeing method. According to this method, a dye solution is prepared in which dye is dispersed in a water/surface active agent solution. The plastic lens is dipped in the dye solution while being heated. As an alternative to the aforementioned dip-dyeing method, a method of sublimating an organic pigment to color plastic lenses is proposed in Japanese Patent Publication 35-1384. As another alternative, a method of sublimating a sublimating dye to color plastic lenses is proposed in Japanese Patent Publication 56-153321, Japanese Patent Publication 56-159376, and Japanese Patent Publication 1-277814.

Because the surface hardness of an unmodified plastic lens is insufficient, there are disadvantages in that the lens is easily scratched and surface reflection develops due to the flickering of images and solid objects. To improve surface hardness, a silicon-based hard coat film is applied to the lens base material, and in order to improve surface reflection, inorganic substances are vapor-deposited on the surface of the lens to create a reflection-preventing film. However, using silicon-based hard coat films and inorganic reflection-preventing films reduces the impact resistance of the plastic lens.

To improve the impact resistance of the plastic lens, it is necessary to improve the surface by placing a primer layer between the lens base material and the silicon-based hard coat film. As an example of this method, it has been proposed to use an epoxy resin as the primer composite (Japanese Patent Publication 60-214301). Alternatively, it has been proposed to use an acrylic polyol and a multi-functional organic isocyanate compound as the primer composite (Japanese Patent Publication 61-114203).

In the method of dipping in a dye solution, which is the conventional method of dyeing plastic lenses, there tend to be great variations in color tone. These are the result of variations in the concentration of the dispersed dye in the dye solution, the amount of dyeing auxiliaries, the temperature of the dye solution, and the dye affinity of the plastic lens base material. It is thus difficult to obtain uniform and consistent dyed plastic lenses in large quantities using the dip-dyeing method.

Moreover, because the vapor phase dyeing methods disclosed in Japanese Patent Publication 56-153321 and Japanese Patent Publication 56-159376 use solid dye-affinity dyes or block-type solid dyes, there are problems in that the dye may not be uniformly heated on the lens surface. Also according to the vapor phase dyeing methods, it is difficult to adjust the dye concentration. With the dyeing method disclosed in Japanese Patent Publication 1-277814, it is necessary to prepare a vacuum environment.

In addition to the above-mentioned problems, the dye is positioned on the surface of the plastic lens in the form of molecules. Thus, plastic lenses which have been dyed by the dip-dyeing method or the vapor phase dyeing method have problems with light resistance and weather resistance. Discoloration and decolocation occur when the dyed lenses are used for long periods of time and struck by strong sunlight in the summer and by ultraviolet rays reflected off of snow in the winter.

On the other hand, in the coloring by the pigment method described in Japanese Patent Publication 35-1384, there are problems in terms of operability. In this method, a vacuum environment is necessary and a treatment temperature of 150–200° C. is used. This creates a danger in that the plastic lens itself will be penetrated, resulting in a loss of optical performance.

When a primer layer is put on a lens which has been dyed by the dipping method and a silicon-based hard coat film is applied on top of the primer layer through dipping, the dyed lens is dipped in hardening solution. The problem with this method is that the dye applied to the lens exudes out into the hardening solution, and this causes the hardening solution to become colored. When subsequent dipping is performed using the same hardening solution, other lenses may become colored by the hardening solution. Thus, a difference develops in the originally-dyed color tone after the hardening process.

SUMMARY OF THE INVENTION

Accordingly, it is an object of the present invention to provide a colored plastic lens which does not discolor when dipped in a hardening solution.

It is another object of the present invention to provide a colored plastic lens which has improved impact- and light-resistance.

It is yet another object of the present invention to provide a colored plastic lens which is easier and less costly to manufacture.

Additional objects and advantages of the invention will be set forth in part in the description which follows, and in part, will be obvious from the description, or may be learned by the practice of the invention.

The foregoing objects of the present invention are achieved by providing a colored plastic lens comprising a plastic substrate having first and second surfaces, a resin film with a pigment dispersed therein formed on one of the first and second surfaces of the plastic substrate, and a hard coat film formed on one of the resin film and the surface of the lens on which the resin film is not formed.

With the colored plastic lens of the present invention, impact resistance is good because of the resin film with the pigment dispersed therein. The resin film with the pigment dispersed therein is disbursed on the lens using a resin vehicle, which improves shock resistance.

BRIEF DESCRIPTION OF THE DRAWINGS

These and other objects and advantages of the present invention will become apparent and more readily appreciated from the following description of the preferred embodiments, taken in conjunction with the accompanying drawings, of which.

DETAILED DESCRIPTION OF Tl-IF PREFERRED EMBODIMENTS

Figure 1:
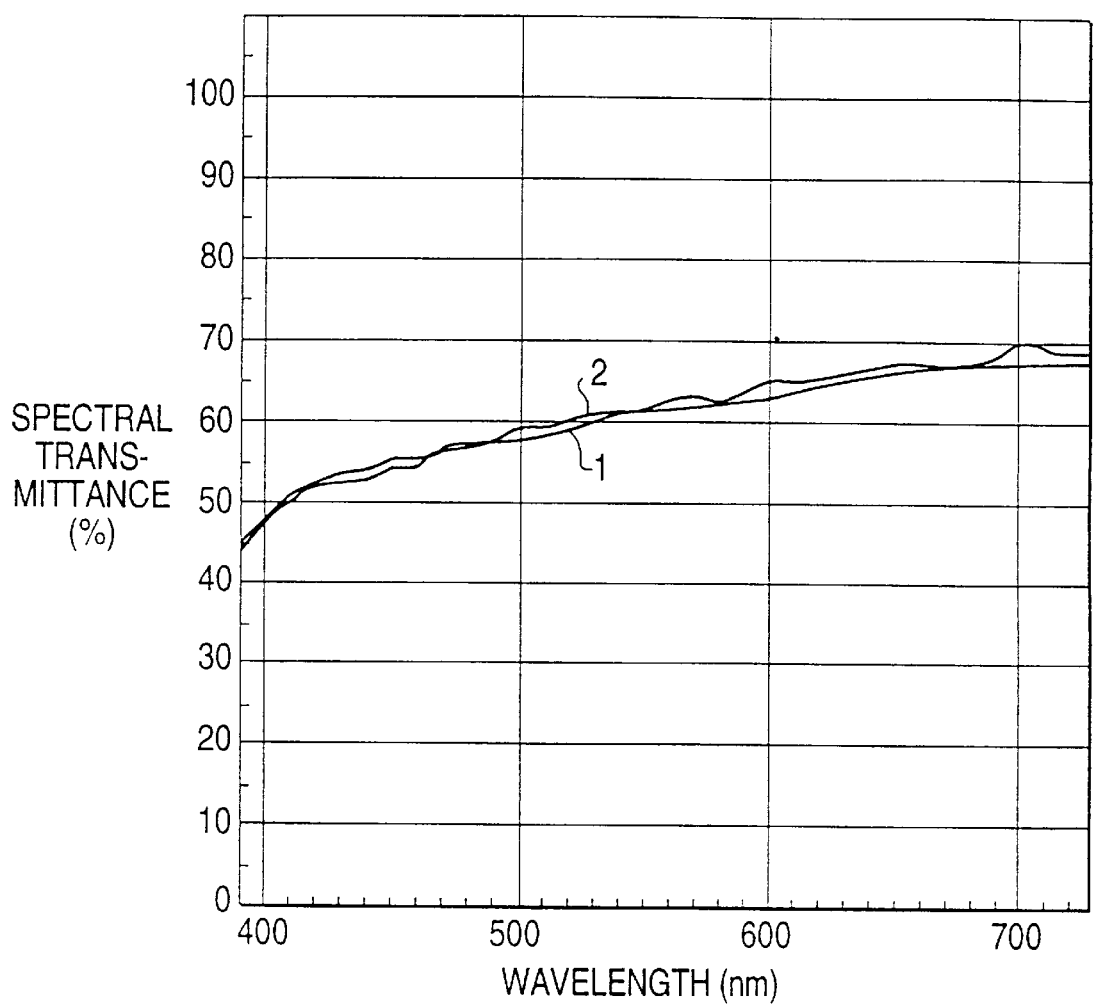
FIG. 1 is a graph which shows the spectral transmittance curves of the colored plastic lens manufactured according to the first embodiment of the present invention.

Reference will now be made in detail to the preferred embodiments of the present invention, examples of which are illustrated in the accompanying drawings, wherein like reference numerals refer to like elements throughout.

An embodiment of the plastic lens according to the present invention comprises, for example, a plastic substrate obtained by polymerizing a monomer mixture. The lens plastic substrate may contain polymethyl methacrylate and its copolymer, an acrylonitrile styrene copolymer, polycarbonate, cellulose acetate, polyvinyl chloride, polyethylene teraphthalate, epoxy resin, unsaturated polyester resin, polyurethane resin, a CR-39 polymer, or one or more types of polyisocyanate, or one or more types of polyol and/or one or more types of polythiol.

The plastic lens further comprises a resin film with a pigment dispersed therein formed on one of the surfaces of the plastic substrate. It is desirable that the pigment dispersed in a resin vehicle to form the resin film used in the embodiment of the present invention be of a small particle diameter, so that the transparency of the lens is not adversely affected.

Based on the aforementioned goal, ultrafine pigments with particle diameters of 0.3 microns or less are appropriate, and those with particle diameters of 0.1 microns or less are especially desirable.

Examples of ultrafine pigments which work well are organic pigments such as phthalocyanine, azos, quinacridones, styrenes, or quinophthalons. Appropriate inorganic pigments include carbon black, titanium-oxide-coated mica, ultramarine blue pigment, white carbon, and zinc oxide.

An appropriate amount of pigment for incorporation into the resin vehicle is 0.1–10 g of pigment per 40 g of resin vehicle.

The resin vehicle used in the embodiment of the present invention should be one which hardens after the pigment is dispersed therein and the resin film applied to the surface of the lens substrate. Thermoplastic resins and thermosetting resins are particularly desirable.

Examples of suitable resins are vinyl chloride resin, vinyl acetate resin, polyamide, polyethylene, polycarbonate, polystyrene, phenol resin, polypropylene, fluororesin, butyrol resin, melamine resin, polyvinyl alcohol, cellulose resin, alkyd, acrylic resin, epoxy resin, urethane resin, polyester resin, and silicon-based resin. One of these resins can be used, but it is also possible to mix several types together or to use copolymers.

A resin vehicle which is especially appropriate for use in the embodiment of the present invention comprises a polyurethane whose main constituents are polyisocyanate and polyol. Impact resistance can be improved by using this resin as the vehicle. In this case, the resin film is formed from an improvement in impact resistance resin.

The polyurethane resin is a thermoplastic resin, and its physical properties are determined by the molecular structure and molecular weight of the diol and diisocyanate which are reacted to yield the polyurethane. The following are examples of suitable diols: alkylene glycols such as ethylene glycol, 1,2-propylene glycol, 1,3-butane diol, 1,4-butane diol, 1,6-hexane diol, neopentyl glycol, dipropylene glycol and diethylene glycol; polyalkylene glycols such as polypropylene glycol, polyethylene glycol, and polytetramethylene glycol; poly(alkylene adipates) such as poly(ethylene adipate), poly(diethylene adipate), poly(tetramethylene adipate), poly(hexamethylene adipate), and poly(neopentylene adipate); poly n-caprolactone; polybutadiene glycols such as poly(1,4-butadiene) glycol and poly(1,2-butadiene) glycol; poly(alkylene carbonates) such as poly(hexamethylene carbonate); and silicon-based polyol.

Examples of suitable diisocyanates are aromatics such as tolylene diisocyanate, 4,4'-diphenylmethane diisocyanate, 1,5-naphthalene diisocyanate, and 3,3'-dimethyl-4,4'-diphenylene diisocyanate and aliphatics such as 1,6-hexamethylene diisocyanate, isophorone diisocyanate, 4,4'-dicyclohexylmethane diisocyanate, xylene diisocyanate, 1,3-bis(isocyanatomethyl) cyclohexane, and trimethylhexamethylene diisocyanate. It is also possible to use other commonly-known diisocyanates.

It is possible to manufacture the polyurethane by commonly-known methods, in which metal compounds such as various types of amines and di-n-butylauroyloxystannate are used as catalysts.

Polyurethane with elongation of 100% or more is desirable, because impact resistance is not improved much with elongation that is less than 100%.

With a resin film thickness of 0.01–30 μm, the improvement in impact resistance is remarkable, with 0.05–20 μm being especially desirable. At thicknesses of less than 0.01 μm, impact resistance is insufficient, and at thicknesses of 30 μm or more, profile irregularity during coating of the lens decreases.

The resin vehicle, which includes the polyurethane resin mixture, is diluted to a concentration appropriate for application of the coating. The possible solvents used for dilution are hydrocarbons, halides, alcohols, ketones, esters and ethers, and it is also possible to use other commonly-known solvents. Toluene, ethyl acetate, methylethyl ketone and tetrahydrofuran are especially desirable. These solvents can be used independently or a mixture of two or more may be used. Moreover, the solvents may contain various types of leveling agents to improve coatability, ultraviolet ray absorbing agents and antioxidants to improve weather resistance as well as other commonly-known additives which improve film performance and function.

Particularly, when a block-type diisocyanate is used as the diisocyanate, pot life can be extended. In a block-type diisocyanate, the isocyanate is protected by what is called a blocking agent. To the contrary, when a non-block type isocyanate is used, the reaction of the activated hydrogen and the isocyanate of the polyol proceeds at room temperature, so the pot life of the coating becomes extremely short. However, a block-type diisocyanate can first be reacted with the activated hydrogen through the liberation of the blocking agent by heating, making the pot life at room temperature extremely long. Examples of block-type polyisocyanates are hexamethylene diisocyanate, isophorone diisocyanate, 4,4'-dicyclohexylmethane diisocyanate, hydrogenated xylene diisocyanate, adducts in which several molecules of each are bonded by various methods, and isocyanurate, allophanate, purette and carbodiimide which have been blocked with acetoacetic acid, malonic acid and methylethyl ketoxime.

As explained above, the resin vehicle of the embodiment of the present invention can form a resin film in a short period of time since the solvent can simply be evaporated without using polymerization and bridge formation reactions. Also, the pot life is extremely long.

Moreover, the resin vehicle does not contain an isocyanate compound. This is beneficial because there is no need to be concerned with restrictions on the solvent used, side reactions with water, or deterioration of the work environment.

Commonly-known coating methods for the resin film, such as the spin coating method and the dipping method, can be used. With these coating methods, there are no particular restrictions on the variables. It is preferable that the lens undergo pretreatment as necessary, such as alkali pretreatment, plasma pretreatment and ultraviolet ray pretreatment.

In the formation of the resin film, after the resin vehicle has been coated on the lens, it is necessary to heat the lens to 100–140° C., and ideally to 110–130° C. At temperatures lower than 100° C., the blocking agent of the block-type polyisocyanate is not liberated, so the curing reaction does not progress. Also, at temperatures higher than 140° C., the lens becomes deformed. At the appropriate temperature, the time required for curing is 15–90 minutes, though it differs according to the heating temperature.

With a resin film thickness of 0.01–30 μm, the improvement in impact resistance is remarkable, with a thickness of 0.05–20 μm being especially desirable. At thicknesses less than 0.01 μm, impact resistance is insufficient, and at thicknesses of 30 μm or more, profile irregularity during coating of the lens decreases.

It is desirable that a coating film be formed on the aforementioned resin film. The coating should be a so-called hard coat film, so that the scratch resistance of the lens can be improved. Organic silicon-based compounds or their hydrolyzates expressed by the following Chemical Formula (I) are particularly desirable.

$$R^1_a R^2_b Si(OR^3)_{4-(a+b)} \quad (I)$$

where $R^1$ is a functional or an organic with 4–14 carbons which have an unsaturated double linkage, $R^2$ is a hydrocarbon with 1–6 carbons or a halogenated hydrocarbon, $R^3$ is an alkyl with 1–4 carbons, an alkoxyalkyl, or an acyl, a and b are 0 and 1 respectively, and a+b is 1 or 2.

Of the compounds of Chemical Formula (I), the following two silicon-based compounds expressed by the Chemical Formulae (II) and (III) are used when $R^1$ contains an epoxy as the functional.

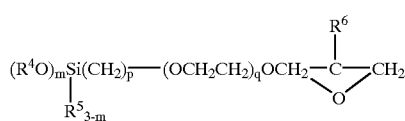
(II)

where $R^4$ is an alkyl with 1–4 carbons, an alkoxyalkyl, or an acyl, $R^5$ is a hydrocarbon with 1–6 carbons or a halogenated hydrocarbon, $R^6$ is hydrogen or a methyl, m is 2 or 3, p is 1–6, and q is 0–2).

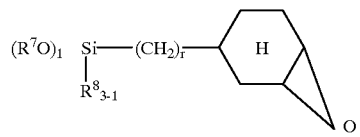
(III)

where $R^7$ is an alkyl with 1–4 carbons, an alkoxyalkyl, or an acyl, $R^8$ is a hydrocarbon with 1–4 carbons or a halogenated hydrocarbon, the letter "l" is 2 or 3, and r is 1–4.

The compounds expressed by the aforementioned general formulas all have epoxy groups. Therefore, they are called epoxysilanes.

Specific examples of epoxysilanes are γ-glycidoxypropyl trimethoxysilane, γ-glyiydoxypropyl triethoxysilane, γ-glycidoxypropyl trimethoxyethoxysilane, γ-glycidoxypropyl triacetoxysilane, γ-glycidoxypropylmethyl dimethoxysilane, γ-glycidoxypropylmethyl diethoxysilane, and β-(3,4-epoxycyclohexyl)ethyl triethoxysilane.

Also, of the compounds of Chemical Formula (I), the following may be used when $R^1$ does not contain an epoxy as the functional group (including those in which a=0): various types of trialkoxysilane, triacyloxysilane and trialkoxysialkoxysilane compounds such as methyl trimethoxysilane, methyl triethoxysilane, vinyl trimethoxysilane, vinyl triethoxysilane, vinyl triacetoxysilane, vinyl trimethoxyethoxysilane, γ-methacryloxypropyl trimethoxysilane, aminomethyl trimethoxysilane, 3-aminopropyl trimethoxysilane, 3-aminopropyl triethoxysilane, phenyl trimethoxysilane, phenyl triethoxysilane, γ-chloropropyl trimethoxysilane, γ-mercaptopropyl triethoxysilane, and 3,3,3-trifluoronpropyl trimethoxysilane.

The example compounds of Chemical Formula (I) above are all examples of (a+b=1) trifunctional compounds with three $OR^3$s which are bonded to Si atoms. Of course, (a+b=2) bifunctional compounds with two $OR^3$s can also be used. Examples of such bifunctional compounds are dimethyl dimethoxysilane, diphenyl dimethoxysilane, methylphenyl dimethoxysilane, methylvinyl dimethoxysilane and dimethyl diethoxysilane.

One type of compound of Chemical Formula (I) may be used, but two or more types may be mixed and used together depending on the objective.

Particularly when bifunctional compounds are used, it is desirable to combine them with trifunctional compounds. Combining results in 2>a+b>1 on average.

Moreover, it is also possible to combine a+b=0 quadrafunctional compounds. Examples of such quadrafunctional compounds are methyl silicate, ethyl silicate, isopropyl silicate, n-propyl silicate, n-butyl silicate, t-butyl silicate, and sec-butyl silicate.

The compounds of Chemical Formula (I) can be used as is, but it is desirable to use them as hydrolyzates with the goal of increasing the reaction speed and decreasing the curing temperature. When two or more compounds with the same number of functions are combined in a bi-quadrafunctional compound, or when two or more compounds with different numbers of functions are combined, they may be combined after hydrolysis or they may be combined before hydrolysis and followed by joint hydrolysis. Hydrolysis causes the alcohol which becomes $HOR^3$ to be liberated, and the compound of Chemical Formula (I)

becomes the corresponding silanol according to one of the following Chemical Formulae (IV) or (V).

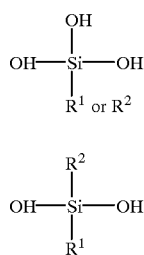

Silanol is an oligomer whose dehydration condensation progresses quickly. Therefore, it can be allowed to stand (cure) for 1–24 hours after hydrolysis so that this reaction will progress sufficiently.

When these composites are used, it is possible to use various types of solvents such as water, lower alcohols, acetone, ether, ketone and esters to improve the sol to increase the hardness or to improve flow during coating and improve the smoothness of the cured film.

For the aforementioned sol, one may use inorganic fine particle sols such as zinc oxide, silicon-based oxide, aluminum oxide, titanium oxide, zirconium oxide, stannous oxide, beryllium oxide, antimony oxide, tungsten oxide, cerium oxide, and a composite sol of stannous oxide and tungsten oxide.

Moreover, these sols do not have to be used alone, but two or more can be combined as necessary.

When titanium oxide, antimony oxide, tungsten oxide, cerium oxide, zirconium oxide and stannous oxide are used as the sol, the refractive index of the composite is increased. The embodiment according to the present invention exhibits particularly superior results when this type of sol is used, due to the raised refractive index.

Water, alcohol and other organic solvents are used as the dispersion medium. It is preferable that an organic amine or other stabilizer be added to the sol.

The particle diameter of the sol should be 1–200 nm, and 5–100 nm is particularly desirable. When the particle diameter is smaller than this, production is difficult, the stability of the sol itself is poor, and efficacy is low. When the particle diameter is larger than this, there is less stability in the coating, less transparency and less smoothness in the film. Some of these sols are well known, and some are available on the market.

Moreover, it is also possible to use a denatured sol in which stannous oxide has been coated with a composite sol of tungsten oxide and stannous oxide. In this denatured sol, colloidal particles, comprising core particles surrounded by composite colloidal particles, are dispersed in a dispersion medium. Stannous oxide (sol) colloidal particles (1) are used as the core particles. The core particles are surrounded completely or incompletely by stannous oxide-tungsten oxide composite colloidal particles (2). The particle diameter of the stannous oxide colloidal particles (1) which form the core is generally 4–50 nm. The particle diameter of the surrounding composite colloidal particles (2) is generally 2–7 nm. The stannous oxide particles (1) which form the core are positively charged. For this reason, when it is mixed with the constituent expressed by Chemical Formula (I), the molecule of Chemical Formula (I) derives from SiO—H+ and has a negative charge, so it aggregates (gels). In contrast to this, the composite particle (2) is negatively charged. For this reason, it will not aggregate even if mixed with Chemical Formula (I).

The stannous oxide-tungsten oxide composite sol is generally manufactured by adding sodium stannate aqueous solution to a tungstic acid aqueous solution. This is done while vigorously agitating at room temperature The tungstic acid aqueous solution is manufactured by ion exchange of sodium tungstate.

The weight ratio of the $WO_3/SnO_2$ of the composite sol is generally 0.5–100. If a weight ratio smaller than 0.5 or greater than 100 is used, when such a coating composite is prepared and a film is formed, a film with inferior performance is obtained.

Denatured sol is manufactured by adding a first liquid to a second liquid while vigorously agitating at room temperature. The first liquid is 2–100 parts by weight by the total weight reduction of $WO_3$ and $SnO_2$ of an aqueous sol of composite (2). The second liquid is 100 parts by weight by $SnO_2$ reduction of an aqueous sol of stannous oxide (1). In this case as well, when less than 2 parts by weight or greater than 100 parts by weight are used, the resulting film exhibits inferior performance. The particle diameter of the double-construction colloidal particles of the denatured sol is generally 4.5–60 nm. When the denatured sol of the first liquid is mixed with the aqueous sol of stannous oxide (the second liquid), the stannous oxide particles and the composite particles (first liquid) are assumed to be chemically bonded. For this reason, the manufactured denatured sol is presumed to be always present, i.e., the store never runs out. This type of denatured sol itself is commonly known, as described in detail in Japanese Patent Publication 3-217230.

In addition to the aforementioned constituents, it is permissible to combine them as needed with various additives in order to improve adhesion with the base material (molded items) on the side to be coated or to improve the stability of the coating composite. Examples of additives are Ph adjusting agents, viscosity adjusting agents, leveling agents, flattening agents, stabilizers, ultraviolet ray absorbing agents and antioxidants.

It is also possible to combine various surface active agents, such as fluorine surface active agent and block or graft copolymers of dimethylsiloxane and alkylene oxide with the coating composite. The surface active agents improve flow during coating and improve the smoothness of the film, which thereby decreases the coefficient of friction of the film surface.

Common coating methods such as paint brush coating, dipping, roll coating, spray coating and flow coating can be used. At this time, the coating conditions are determined mainly according to the characteristics of the vehicle.

In order to promote the reaction and cure at low temperatures, the following curing solvents can be used. Curing solvents save time in polymerizing the vehicle constituent to form a film with a three-dimensional network structure. However, those which would adversely affect the stability of the coating composite are not desirable. The following are examples of suitable curing solvents.

(1) Amines:

Monoethanol amine, diethanol amine, isopropanol amine, ethylene diamine, isopropyl amine, diisopropyl amine, morpholine, triethanol amine, diamino propane, aminoethylethanol amine, dicyandiamide, triethylene diamine, and 2-ethyl-4-methyl imidazole.

(2) Various metallic complex compounds:

An aluminum chelate compound expressed by the Chemical Formula (VI):

$$AlX_nY_{3-n},\qquad\text{(VI)}$$

where X is OL (L is a lower alkyl), n is 1 or 2 and Y is at least one ligand from among those derived from the general formulae $M^1$ $COCH_2$ $COM^2$ ($M^1$ and $M^2$ are lower alkyls) and $M^1$ $COCH_2$ $COOM^2$.

Especially useful in terms of solubility, stability and catalyst curing are chelate compounds, including aluminum acetylacetonate, aluminum bis-ethylacetoacetate, monoacetylacetonate, aluminum-di-n-butoxide-monoethylacetoacetate, and aluminum-di-iso-propoxide-monomethylacetoacetate.

Other useful metallic complex compounds include chromium acetylacetonate, titanyl acetylacetonate, cobalt acetylacetonate, iron (III) acetylacetonate, manganese acetylacetonate, nickel acetylacetonate, EDTA, as well as complex compounds such as Al, Fe, Zn, Zr and Ti.

(3) Metal alkoxides:

Aluminum triethoxide, aluminum tri-n-propoxide, aluminum tri-n-butoxide, titanium tetraethoxide, titanium tetra-n-butoxide, and titanium tetra-i-propoxide.

(4) Organic metallic salts:

Sodium acetate, zinc naphthenate, cobalt naphthenate, zinc octylate and stannous octylate.

(5) Perchlorates:

Magnesium perchlorate and ammonium perchlorate.

(6) Organic acids and their anhydrides:

Malonic acid, succinic acid, tartaric acid, adipic acid, azelaic acid, maleic acid, O phthalic acid, terephthalic acid, fumaric acid, itaconic acid, oxalacetic acid, anhydrous succinic acid, anhydrous maleic acid, anhydrous itaconic acid, 1,2-dimethylmaleate anhydride, anhydrous phthalic acid, hexahydropthalate anhydride and anhydrous naphthalate.

(7) Lewis acids:

Ferric chloride and aluminum chloride.

(8) Halogenated metals:

Stannous chloride, stannic chloride, stannous bromide, zinc chloride, zinc bromide, titanium tetrachloride, titanium bromide, thallium bromide, germanium chloride, hafnium chloride, lead chloride and lead bromide.

The above catalysts need not be used alone; two or more can be mixed together and used.

When the vehicle constituent has an epoxy, those which also have a ring-opening polymerization catalyst of the epoxy can be used.

Therefore, an aluminum chelate compound is a preferable catalyst. The coating film positioned on top of the aforementioned resin film with the pigment dispersed therein may be, for example, a hard coat film or an anti-reflection film. Silicon-based resin is an example of a preferable hard coat film, in terms of it being a type of resin which improves scratch resistance. The present invention is not limited to a silicon-based resin. Examples of other hard coat films which can be used are acrylic resins, melamine resins, epoxy resins, polyester resins and urethane resins.

Some methods of applying the coating film are the dipping method, the spray coat method, the roll coat method, the spin coat method, and brushing.

The colored plastic lens of the present invention formed in the aforementioned manner has a pigment dispersed in a resin film, which film has a thickness of several $\mu$m with respect to a lens thickness of several $\mu$m. The coating film (for example, hard coat film) thickness is approximately 2 $\mu$m. The film can be placed on either lens surface; that with the resin film with the pigment dispersed therein or that with the coating film. It can be formed on one surface, for example, the eyepiece side surface, or on both surfaces.

The colored plastic lens according to a further embodiment of the present invention can also be coated with an anti-reflection film and other films as necessary.

Because with the colored plastic lens of the present invention, a resin film with pigment dispersed therein is formed on the lens substrate surface, there is no disparity in dyeing; uniform and consistent coloring is possible. Moreover, discoloration arising from long periods of usage does not occur. Also, when a hard coat film is formed on top of the resin film with the pigment dispersed therein as a coating film, the dye does not exude out into the hard coat solution even if dipped in a hard coat solution such as silicon-based resin.

With the plastic lens according to the embodiment of the present invention, the resin film is formed between the molded plastic lens, i.e., the plastic lens substrate, and the hard coat film, so the impact resistance of the plastic lens is improved.

Embodiments of the present invention will be explained below.

Embodiment 1:

For the urethane resin vehicle, 2 g of 0.06 micron ultrafine particle pigment, Micropigmo Black AM-BK2 (brand name of Orient Chemical Industries K.K.) was dispersed in a vehicle consisting of 40 g of a urethane resin whose main constituents are polyisocyanate (Colonnade 2529, made by Japan Polyurethane K.K.) and polyol (Nippolan 1100, made by Japan Polyurethane K.K.). As a surface active agent, 0.2 g of FC-430 made by Sumitomo 3M K.K. was used. This dispersion solution was applied by spin-coating onto the concave surface of a molded plastic lens (CR-39), and cured at 100° C. for one hour. The resulting lens was dipped in a silicon-based resin solution, and a silicon-based resin cured film was formed.

An example of the coating and the method of preparing the silicon-based resin solution will now be explained. Preliminary composite A and preliminary composite B are prepared, and based on these, the coating solution is prepared.

(1) Preparation of preliminary composite A:

248 parts by weight of γ-glycidoxypropylmethyl diethoxysilane was incorporated into a reaction container which was equipped with a rotor. 36 parts by weight of 0.05 normal hydrochloric acid aqueous solution was added to the reaction container all at once while vigorously agitating with a magnetic stirrer.

Immediately after addition, the solution was heterogeneous. However, it became a uniform, colorless and clear solution during agitation for several minutes. Agitation was then continued for one hour to obtain a hydrolyzate.

After adding 56.6 parts by weight of ethanol and 53.4 parts by weight of ethylene glycol to the hydrolyzate, 4.7 parts by weight of aluminum acetylacetonate were added. These were sufficiently mixed and dissolved to prepare preliminary composite A.

(2) Preparation of preliminary composite B:

212.4 parts by weight of γ-glycidoxypropyl trimethoxysilane was incorporated into a reaction container which was equipped with a rotor. The temperature inside the container was maintained at 10° C. 48.6 parts by weight of 0.01 normal hydrochloric acid aqueous solution was gradually titrated into the reaction chamber while vigorously agitating with a magnetic stirrer. Cooling was stopped, and a uniform, colorless, and clear solution-state hydrolyzate was obtained.

After adding 77.1 parts by weight of ethanol and 37.7 parts by weight of ethylene glycol to the hydrolyzate, 7.65 parts by weight of aluminum acetylacetonate were added, and these were sufficiently mixed and dissolved to prepare preliminary composite B.

(3) Preparation of the coating composite:

The composite aqueous sol was manufactured by adding sodium stannate aqueous solution, while vigorously agitating at room temperature, to a tungstic acid aqueous solution manufactured by ion exchange of sodium tungstate aqueous solution. The weight ratio of $WO_3$ to $SnO_2$ in this sol is approximately 1. The particle diameter is approximately 4–5 nm.

Next, 100 parts by weight by $SnO_2$ reduction of a stannous oxide aqueous sol (with a particle diameter of 7–40 nm), which is available on the market, was used. In contrast to this, the denatured sol (specific gravity=1.030) was manufactured by adding the aforementioned composite sol in an amount of 25–60 parts by weight by total weight reduction of $WO_3$ and $SnO_2$ while agitating at room temperature. After this, purification treatment was implemented to obtain a high-concentration denatured sol with a specific gravity of approximately 1.172. The colloidal particles of this sol have a double construction in which composite particles with particle diameters of approximately 45 nm surround a core of stannous chloride particles with particle diameters of approximately 7–40 nm.

100 parts by weight (not the solid content) of preliminary composites A and B, which were prepared according to (1) and (2) above, were weighed out and poured into a glass container. 50 parts by weight (not the solid content) of the high-concentration denatured sol manufactured in the aforementioned way and 0.4 parts by weight of a silicon-based surface active agent were added to this. By sufficiently agitating and mixing these, a uniform, colorless and clear solution coating composite was prepared.

(4) Coating:

A CR-39 eyeglass lens was used, and the aforementioned coating composite was applied by the dipping method (lift speed: 10 cm/minute). Heat treatment was performed for two hours at 100° C., and the film was cured.

FIG. 1 shows the spectral transmittance curve 1 of the lens before formation of the silicon-based resin cured film, as well as the spectral transmittance curve 2 of the lens after formation of the silicon-based resin cured film. The luminous transmittance of the colored plastic lens was 63%, so a uniform lens with high clarity was obtained. Even when a silicon-based resin cured film was applied, neither the color tone nor the luminous transmittance changed, and the color difference before and after silicon-based resin was applied was 0.6%.

Embodiment 2:

4 g of 0.07 micron ultrafine particle pigment, Micropigmo Green AM-GN2 (brand name of Orient Chemical Industries K.K.), was dispersed in a vehicle consisting of 40 g of the urethane resin used in the first embodiment and 0.2 g of a surface active agent. This dispersion solution was applied by spin-coating onto the concave surface of the same molded plastic lens used in the first embodiment, and curing at 100° C. for one hour was performed. Moreover, this lens was dipped in the silicon-based resin solution used in the first embodiment, and a silicon-based resin cured film was formed.

Figure 2:
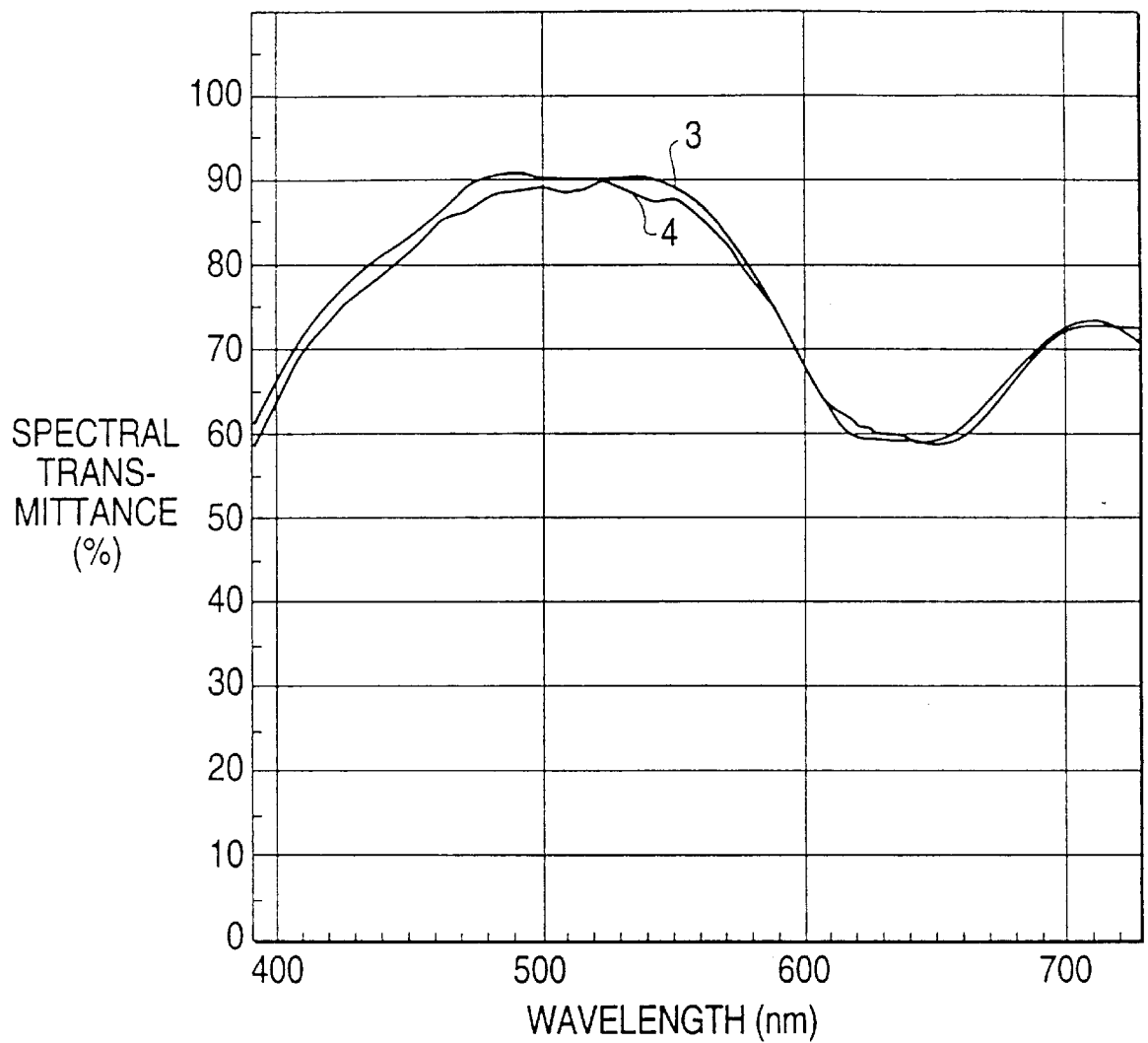
FIG. 2 is a graph which shows the spectral transmittance curves of the colored plastic lens manufactured according to the second embodiment of the present invention.

FIG. 2 shows the spectral transmittance curve 3 of the lens before formation of the silicon-based resin cured film, as well as the spectral transmittance curve 4 of the lens after formation of the silicon-based resin cured film. The luminous transmittance of the colored plastic lens was 81%, so a uniform lens with high clarity was obtained. Even when a silicon-based resin cured film was applied, neither the color tone nor the luminous transmittance changed, and the color difference before and after silicon-based resin was applied was 0.9.

Comparative Example:

The dye solution of KPRD RED 306 Dye (made by Mitsui Toatsu Chemicals, Inc.) was dispersed in water along with a surface active agent. The resulting dispersion was then heated, and a molded plastic lens which is the same as the one used in the first embodiment was dipped therein for approximately 10 minutes. As a result, there was coloring to a luminous transmittance of 56%. The now-colored lens was dipped in a urethane resin which was the same as the one used in the first embodiment, and when dipped in a silicon-based resin solution after hot setting, it was observed that the dye was exuded into the silicon-based resin solution.

Figure 3:
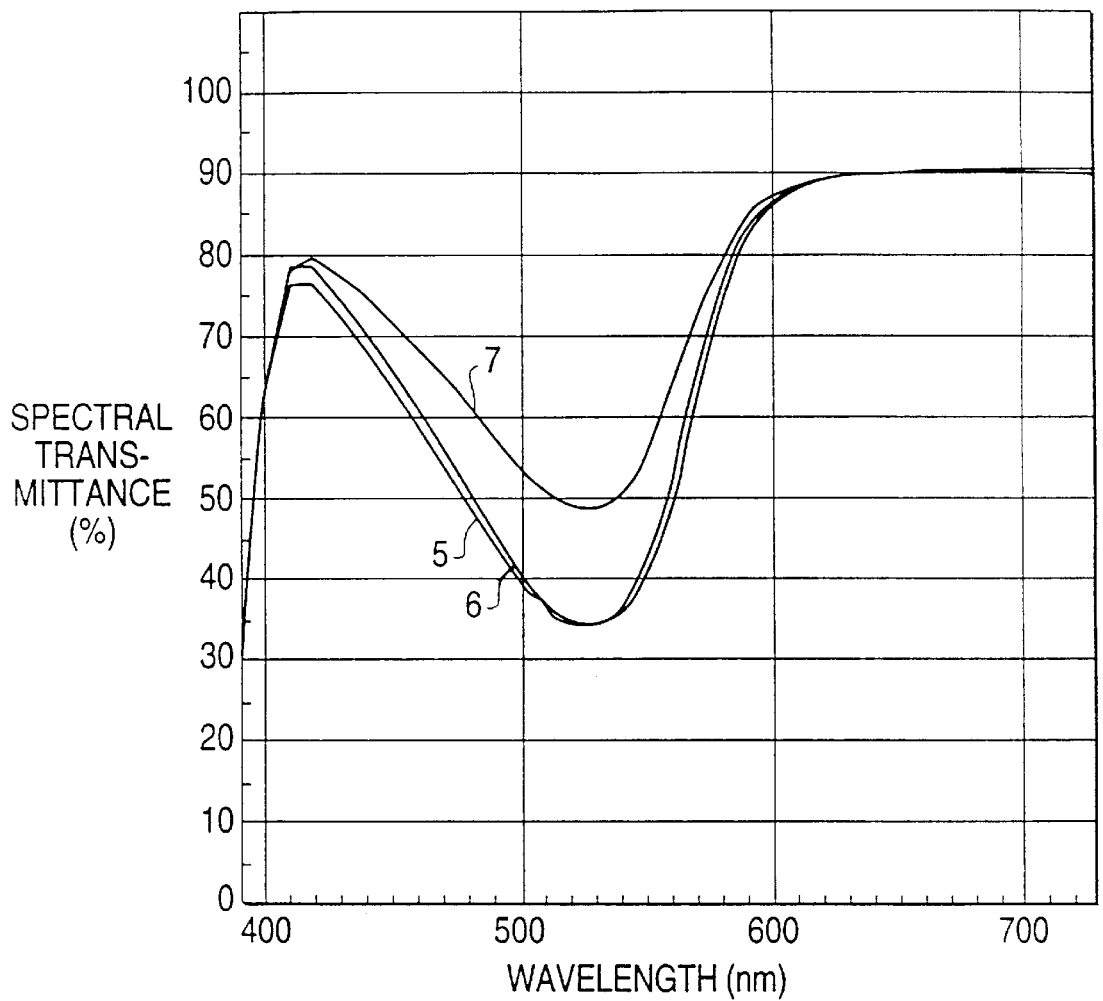
FIG. 3 is a graph which shows the spectral transmittance curves of the colored plastic lens manufactured according to the comparison example.

FIG. 3 shows the spectral transmittance curve 5 before formation of a urethane resin layer and after coloring by a dye. The spectral transmittance curve 6 shows transmittance before formation of a silicon-based resin layer and after formation of a urethane resin layer. Spectral transmittance curve 7 shows transmittance after formation of a silicon-based resin layer. Through dipping in a silicon-based resin solution, the luminous transmittance became 66% and the color difference before and after silicon-based resin was applied became 19.24%, causing severe discoloration.

Because the coloring with the colored plastic lens of the present invention is such that no color difference results from the dyeing agent, and a resin film with pigment dispersed therein is formed on the lens surface, a colored plastic lens with superior weather resistance and superior light resistance can be obtained.

When a hard coat film, such as a silicon-based resin layer, is formed on top of the resin film with pigment dispersed therein, the pigment does not exude out even when dipped in a hard coat solution. Thus, there is no change in color tone after hard coat processing due to decoloring, and the hard coat solution does not become colored.

The pigment dispersed in a resin film plays the role of improving the impact resistance between the plastic lens base material and the hard coat film. If a resin with improved impact resistance, such as a urethane resin, is used as the resin vehicle for the pigment, impact resistance is even further improved.

Although a few preferred embodiments of the present invention have been shown and described with respect to specific components for the colored plastic lens, it would be appreciated by those skilled in the art that changes may be made in these embodiments without department from the principles and spirit of the invention, the scope of which is defined in the claims and their equivalents.

What is claimed is:

1. A colored plastic lens, comprising:
   a plastic substrate having first and second surfaces;
   an impact resistant resin film with carbon black or an organic pigment dispersed therein, formed on one of the first and second surfaces of the plastic substrate; and
   a colorless hard coating film formed on the resin film and the surface of the plastic substrate on which the resin film is not formed, the plastic substrate, resin film and the hard coating film forming a lens which is substantially transparent, the hard coating film being made from a composition comprising
   at least one epoxysilane or hydrolyzate thereof, wherein any organopolysiloxane present in the hard coating film is polymerized from an epoxysilane selected from the group consisting of γ-glycidoxypropyl trimethoxysilane, γ-glycidoxypropyl triethoxysilane, γ-glycidoxypropyl trimethoxyethoxysilane, γ-glycidoxypropyl triacetoxysilane, γ-glycidoxypropylmethyl dimethoxysilane, γ-glycidoxypropylmethyl diethoxysilane, and β-(3, 4-epoxycyclohexyl)ethyl triethoxysilane or is polymerized from a hydrolyzate of an epoxysilane selected from said group, and optionally, one or more materials selected from the group consisting of inorganic oxide sols, pH adjusting agents, solvents, stabilizers, ultraviolet ray absorbing agents, antioxidants, curing catalysts and curing solvents.

2. A colored plastic lens according to claim 1, wherein said plastic substrate contains two or more polymers selected from the group consisting of polymethyl methacrylate, acrylonitrile styrene, polycarbonate, cellulose acetate, polyvinyl chloride, polyethylene terephthalate, an epoxy resin, an unsaturated polyester resin, a polyurethane resin, and a CR-39 polymer.

3. A colored plastic lens according to claim 1, wherein the organic pigment is dispersed in the resin film and is selected from the group consisting of phthalocyanines, azo compounds, quinacridones and quinophthalones.

4. A colored plastic lens according to claim 1, wherein said resin film is formed from a polyurethane polymerized from polyisocyanate and polyol.

5. A colored plastic lens according to claim 4, wherein the polyol used to form the polyurethane is selected from the group consisting of an alkylene glycol, a polyalkylene glycol, a poly(alkylene adipate), poly n-caprolactone, a polybutadiene glycol, a poly(alkylene carbonate) and a silicon-containing polyol.

6. A colored plastic lens according to claim 4, wherein the polyisocyanate used to form the polyurethane is selected from the group consisting of hexamethylene diisocyanate, isophorone diisocyanate, 4,4'-dicyclohexylmethane diisocyanate, hydrogenated xylene diisocyanate, isocyanurates, allophanates and block-type polyisocyanates.

7. A colored plastic lens according to claim 1, wherein the inorganic oxide sol of the coating film has a particle diameter of 1 to 200 nm.

8. A colored plastic lens according to claim 1, wherein the inorganic sol of the coating film has a particle diameter of 5–100 nm.

9. A colored plastic lens according to claim 1, wherein the inorganic oxide sols are selected from the group consisting of zinc oxide, silicon-based oxide, aluminum oxide, titanium oxide, zirconium oxide, stannous oxide, beryllium oxide, antimony oxide, tungsten oxide, and cerium oxide.

10. A colored plastic lens according to claim 1, wherein the inorganic oxide sol is a stannous oxide-tungsten oxide composite sol having a weight ratio of $WO_3:SnO_2$ of 0.5:1 to 100:1.

11. A colored plastic lens according to claim 1, wherein the curing catalysts are selected from the group consisting of monoethanol amine, diethanol amine, isopropanol amine, ethylene diamine, isopropyl amine, diisopropyl amine, morpholine, triethanol amine, diamino propane, aminoethylethanol amine, dicyandiamide, triethylene diamine, 2-ethyl-4-methyl imidazole, aluminum acetylacetonate, aluminum bis-ethylacetoacetate, monoacetylacetonate, aluminum-di-n-butoxide-monoethylacetoacetate, aluminum-di-isopropoxide-monomethylacetoacetate, chromium acetylacetonate, titanyl acetylacetonate, cobalt acetylacetonate, iron (III) acetylacetonate, manganese acetylacetonate, nickel acetylacetonate, EDTA, aluminum triethoxide, aluminum tri-n-propoxide, aluminum tri-n-butoxide, titanium tetraethoxide, titanium tetra-n-butoxide, titanium tetra-i-propoxide, sodium acetate, zinc naphthenate, cobalt naphthenate, zinc octylate, stannous octylate, magnesium perchlorate, ammonium perchlorate, malonic acid, succinic acid, tartaric acid, adipic acid, azelaic acid, maleic acid, O phthalic acid, terephthalic acid, fumaric acid, itaconic acid, oxalacetic acid, anhydrous succinic acid, anhydrous maleic acid, anhydrous itaconic acid, 1,2-dimethylmaleate anhydride, anhydrous phthalic acid, hexahydrophthalate anhydride, anhydrous naphthalate, ferric chloride, aluminum chloride, stannous chloride, stannic chloride, stannous bromide, zinc chloride, zinc bromide, titanium tetrachloride, titanium bromide, thallium bromide, germanium chloride, hafnium chloride, lead chloride and lead bromide.

12. A colored plastic lens according to claim 1, wherein the second surface of the plastic substrate is concave and the resin film is formed on the second surface of the plastic substrate.

13. A colored plastic lens according to claim 12, wherein the resin film is formed on the substrate by spin coating.

14. A method of forming a colored plastic lens, comprising:

(a) providing a plastic substrate having first and second sides;

(b) dispersing a carbon black or an organic pigment in a resin vehicle;

(c) coating the carbon black or organic pigment dispersed resin vehicle on one of the first and second sides of the plastic substrate to thereby form an impact resistant resin film; and (d) forming a colorless hard coating film on the resin film and the surface of the plastic substrate on which the resin film is not formed, thereby forming a lens which is substantially transparent, the hard coating film being made from a composition comprising at least one epoxysilane or hydrolyzate thereof, wherein any organopolysiloxane present in the hard coating film is polymerized from an epoxysilane selected from the group consisting of γ-glycidoxypropyl trimethoxysilane, γ-glycidoxypropyl triethoxysilane, γ-glycidoxypropyl trimethoxyethoxysilane, γ-glycidoxypropyl triacetoxysilane, γ-glycidoxypropylmethyl dimethoxysilane, γ-glycidoxypropylmethyl diethoxysilane, and β-(3, 4-epoxycyclohexyl)ethyl triethoxysilane or is polymerized from a hydrolyzate of an epoxysilane selected from said group, and optionally, one or more materials selected from the group consisting of inorganic oxide sols, pH adjusting agents, solvents, stabilizers, ultraviolet ray absorbing agents, antioxidants, curing catalysts and curing solvents.

15. The method of forming a colored plastic lens according to claim 14, wherein before step (c), the plastic substrate is subjected to a pretreatment selected from the group consisting of alkali pretreatment, plasma pretreatment and ultraviolet ray pretreatment.

16. The method of forming a colored plastic lens according to claim 14, wherein step (c) includes the substeps of:

spin-coating the carbon black or organic pigment dispersed resin vehicle on the plastic lens; and curing the spin-coated lens.

17. The method of forming a colored plastic lens according to claim 14, wherein the coating film is formed in step (d) by dipping.

18. A method of forming a colored plastic lens according to claim 14, wherein the inorganic oxide sols are selected from the group consisting of zinc oxide, silicon-based oxide, aluminum oxide, titanium oxide, zirconium oxide, stannous oxide, beryllium oxide, antimony oxide, tungsten oxide and cerium oxide.

19. A method of forming a colored plastic lens according to claim 14, wherein the curing catalysts are selected from the group consisting of monoethanol amine, diethanol amine, isopropanol amine, ethylene diamine, isopropyl amine, diisopropyl amine, morpholine, triethanol amine, diamino propane, aminoethylethanol amine, dicyandiamide, triethylene diamine, 2-ethyl-4-methyl imidazole, aluminum acetylacetonate, aluminum bisethylacetoacetate, monoacetylacetonate, aluminum-di-n-butoxide-monoethylacetoacetate, aluminum-di-iso-propoxide-monomethylacetoacetate, chromium acetylacetonate, titanyl acetylacetonate, cobalt acetylacetonate, iron (III) acetylacetonate, manganese acetylacetonate, nickel acetylacetonate, EDTA, aluminum triethoxide, aluminum tri-n-propoxide, aluminum tri-n-butoxide, titanium tetraethoxide, titanium tetra-n-butoxide, titanium tetra-i-propoxide, sodium acetate, zinc naphthenate, cobalt naphthenate, zinc octylate, stannous octylate, magnesium perchlorate, ammonium perchlorate, malonic acid, succinic acid, tartaric acid, adipic acid, azelaic acid, maleic acid, O phthalic acid, terephthalic acid, fumaric acid, itaconic acid, oxalacetic acid, anhydrous succinic acid, anhydrous maleic acid, anhydrous itaconic acid, 1,2-dimethylmaleate anhydride, anhydrous phthalic acid, hexahydrophthalate anhydride, anhydrous naphthalate, ferric chloride, aluminum chloride, stannous chloride, stannic chloride, stannous bromide, zinc chloride, zinc bromide, titanium tetrachloride, titanium bromide, thallium bromide, germanium chloride, hafnium chloride, lead chloride and lead bromide.

* * * * *

UNITED STATES PATENT AND TRADEMARK OFFICE
CERTIFICATE OF CORRECTION

PATENT NO.: 6,027,816
DATED : February 22, 2000
INVENTOR(S): Ichiro ONO, et al.

It is certified that error appears in the above-identified patent and that said Letters Patent is hereby corrected as shown below:

ABSTRACT line 5, after "on" (first occurrence) insert --one of--.

Signed and Sealed this

Twenty-fourth Day of April, 2001

Attest:

NICHOLAS P. GODICI

Attesting Officer    Acting Director of the United States Patent and Trademark Office